United States Patent
Walters et al.

(12) 
(10) Patent No.: US 7,455,912 B2
(45) Date of Patent: Nov. 25, 2008

(54) COMPOSITIONS CONTAINING A SILANOL FUNCTIONAL POLYMER AND RELATED HYDROPHILIC COATING FILMS

(75) Inventors: David N. Walters, Slippery Rock, PA (US); Truman F. Wilt, Clinton, PA (US); Kaliappa G. Ragunathan, Gibsonia, PA (US); Brian E. Turner, Butler, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 279 days.

(21) Appl. No.: 11/260,983

(22) Filed: Oct. 28, 2005

(65) Prior Publication Data

US 2007/0099002 A1  May 3, 2007

(51) Int. Cl.
*B32B 9/04* (2006.01)
(52) U.S. Cl. .................. 428/447; 428/500; 428/522; 526/279; 526/317.1; 526/319; 106/287.16; 106/287.12; 528/34
(58) Field of Classification Search .............. None
See application file for complete search history.

(56) References Cited

U.S. PATENT DOCUMENTS

| | | | | |
|---|---|---|---|---|
| 5,162,420 A | | 11/1992 | Chang et al. ............... 524/457 |
| 5,376,704 A | * | 12/1994 | Barsotti ..................... 523/414 |
| 5,855,960 A | * | 1/1999 | Ohnishi et al. .............. 427/337 |
| 6,048,910 A | | 4/2000 | Furuya et al. ............... 522/86 |
| 6,576,082 B2 | | 6/2003 | Okamoto et al. ............ 156/329 |
| 6,599,976 B2 | | 7/2003 | Kobayashi et al. .......... 524/837 |
| 6,610,777 B1 | | 8/2003 | Anderson et al. ........... 524/588 |
| 6,624,243 B2 | * | 9/2003 | Stark et al. .................. 524/832 |
| 6,657,001 B1 | | 12/2003 | Anderson et al. ........... 524/588 |
| 6,812,293 B1 | | 11/2004 | Koelliker ................. 525/326.5 |
| 2002/0068176 A1 | * | 6/2002 | Yokoyama et al. ....... 428/423.1 |

FOREIGN PATENT DOCUMENTS

| | | |
|---|---|---|
| DE | 197 46 327 C1 | 4/1999 |
| JP | 61-009463 A  * | 1/1986 |
| JP | 63147535 | 6/1988 |
| JP | 3191259 | 7/2001 |
| JP | 3366949 | 1/2003 |
| JP | 3473878 | 12/2003 |
| JP | 3583740 | 11/2004 |
| WO | WO 00/26263 | 5/2000 |

\* cited by examiner

*Primary Examiner*—Marc S Zimmer
(74) *Attorney, Agent, or Firm*—Donald R Palladino

(57) ABSTRACT

Disclosed are coating compositions that include a polymer comprising silanol functional groups. Also disclosed are substrates coated with such compositions, methods for coating substrates with such compositions, and methods for imparting self cleaning properties to a substrate.

20 Claims, No Drawings

COMPOSITIONS CONTAINING A SILANOL FUNCTIONAL POLYMER AND RELATED HYDROPHILIC COATING FILMS

FIELD OF THE INVENTION

The present invention is directed to coating compositions that include a polymer comprising silanol functional groups. The present invention is also directed to substrates coated with such compositions, methods for coating substrates with such compositions, and methods for imparting self cleaning properties to a substrate.

BACKGROUND OF THE INVENTION

Coating compositions that exhibit hydrophilic properties are often desirable for certain coating applications, such as where coated surfaces exhibiting anti-fouling, easy-to-clean, self-cleaning, and/or anti-fogging properties are desired. Such coatings can be particularly useful, by way of example, for application to surfaces exposed to the outdoor environment. Building structures, automobiles, and other articles that are exposed to the outdoors are likely to come in contact with various contaminants, such as dirt, oil, dust, and clay, among others. A surface with a hydrophilic coating deposited thereon may be self-cleaning because the coating has the ability to wash those contaminants away when the surface comes in contact with water, such as during a rainfall.

In view of these and other advantages, various hydrophilic coating compositions have been proposed. Many of these coatings achieve their hydrophilicity through the action of a photocatalytic material, such as titanium dioxide. The use of such materials can, however, in at least certain applications, be problematic. For example, when applying such a material over an organic film, such as a typical coating composition used in automotive applications, the photocatalytic material may contact the organic film. Because an —OH free radical is generated by the photocatalytic action of a photocatalytic material, the underlying organic film is susceptible to degradation.

As a result, it would be advantageous to provide a coating composition that can produce thin coating films that exhibit hydrophilic properties and, therefore, self-cleaning properties. Furthermore, it would be desirable to provide such compositions that do not necessarily rely on the use of a photocatalytic material to produce such properties.

SUMMARY OF THE INVENTION

In certain respects, the present invention is directed to low-solids, aqueous coating compositions comprising a polymer comprising silanol functional groups which are present on the polymer in an amount sufficient to give the polymer a silanol value of at least 300.

The present invention is also directed to substrates at least partially coated with a coating film deposited from such a composition, as well as methods of coating a substrate with such a composition.

In another respect, the present invention is directed to a coating film comprising a polymer comprising silanol groups that are present on the polymer in an amount sufficient to render the coating film hydrophilic.

In yet another respect, the present invention is directed to methods for imparting self cleaning properties to at least a portion of a substrate. The methods comprise (i) applying to the substrate a low-solids, aqueous coating composition comprising a polymer comprising silanol groups, and (ii) allowing the composition to cure such that the resulting coating film is hydrophilic.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, certain embodiments of the present invention are directed to "low-solids" coating compositions. As used herein, the term "low-solids" refers to compositions that have a total organic resin solids content of less than 25 percent by weight, such as no more than 15 percent by weight, based on the total weight of the composition. In certain embodiments, the low-solids compositions of the present invention have a total organic resin solids content of 1 to 10 percent by weight, such as 1 to 3 percent by weight, based on the total weight of the composition.

Certain embodiments of the present invention are directed to "aqueous" coating compositions. As used herein, the term "aqueous coating composition" means that the solvent or carrier fluid for the composition contains water in an amount sufficient to hydrolyze silane groups existing on a polymer in the composition such that, upon hydrolysis, the polymer has a silanol value of at least 300. In certain embodiments, the solvent or carrier fluid in such aqueous compositions primarily or principally comprises water. For example, in certain embodiments, the carrier fluid is at least 50 weight percent water, or, in some cases, at least 80 percent water or, in yet other cases, the carrier fluid consists essentially of only water.

In certain embodiments, the coating compositions of the present invention are in the form of an aqueous dispersion comprising a polymer comprising silanol functional groups.

As used herein, the term "aqueous dispersion" refers to a composition wherein an organic component is in a dispersed phase as particles distributed throughout a continuous phase, which includes water. As used herein, the term "organic component" is meant to encompass all of the organic species present in the aqueous dispersion, including any polymers, as well as any organic solvents.

As used herein, the term "polymer" is meant to include both homopolymers and copolymers. As indicated, certain embodiments of the present invention are directed to compositions that comprise a polymer comprising silanol functional groups which are present on the polymer in an amount sufficient to give the polymer a silanol value of at least 300, such as 300 to 1600, or, in some cases, 400 to 800, or, in yet other cases, 500 to 800. For purposes of the present invention, the term "silanol value" refers to the calculated amount of KOH (in milligrams) required to theoretically convert all of the silanol groups existing in one gram of a polymer to potassium salt, assuming that one KOH molecule converts one silanol group to potassium salt. The Examples herein illustrate the proper way to determine the "silanol value" of a polymer for purposes of the present invention.

In certain embodiments of the compositions of the present invention, the polymer comprises an acrylic polymer. As used herein, the term "acrylic" polymer refers to those polymers that are well known to those skilled in the art which result from the polymerization of one or more ethylenically unsaturated polymerizable materials. Acrylic polymers suitable for use in the present invention can be made by any of a variety of methods, as will be understood by those skilled in the art. In certain embodiments, such acrylic polymers are made by addition polymerization of different unsaturated polymerizable materials, at least one of which is a silane-containing ethylenically unsaturated polymerizable material. The result of such a polymerization is an acrylic polymer that comprises hydrolyzable silane functional groups. Examples of hydrolyzable silane groups include, without limitation, groups having the structure Si—$X_n$ (wherein n is an integer having a value ranging from 1 to 3 and X is selected from chlorine, bromine, iodine, alkoxy esters, and/or acyloxy esters).

Examples of silane-containing ethylenically unsaturated polymerizable materials, suitable for use in preparing such acrylic polymers include, without limitation, ethylenically unsaturated alkoxy silanes and ethylenically unsaturated acyloxy silanes, more specific examples of which include acrylatoalkoxysilanes, such as gamma-acryloxypropyl trimethoxysilane and gamma-acryloxypropyl triethoxysilane, and methacrylatoalkoxysilanes, such as gamma-methacryloxypropyl trimethoxysilane, gamma-methacryloxypropyl triethoxysilane and gamma-methacryloxypropyl tris-(2-methoxyethoxy) silane; acyloxysilanes, including, for example, acrylato acetoxysilanes, methacrylato acetoxysilanes and ethylenically unsaturated acetoxysilanes, such as acrylatopropyl triacetoxysilane and methacrylatopropyl triacetoxysilane. In certain embodiments, it may be desirable to utilize monomers which, upon addition polymerization, will result in an acrylic polymer in which the Si atoms of the resulting hydrolyzable silyl groups are separated by at least two atoms from the backbone of the polymer.

In certain embodiments, the amount of the silane-containing ethylenically unsaturated polymerizable material used in the total monomer mixture is chosen so as to result in the production of an acrylic polymer comprising silane groups that, upon hydrolysis in an aqueous medium, convert to silanol functional groups which are present on the acrylic polymer in an amount sufficient to give the polymer a silanol value of at least 300, such as 300 to 1600, or, in some cases 400 to 800, or, in yet other cases, 500 to 800, as indicated earlier. In certain embodiments, to achieve the desired silanol content in the final polymer, the amount of such silane-containing ethylenically unsaturated polymerizable materials comprises at least 50 percent by weight, such as at least 70 percent by weight, with weight percents being based on the weight of the total monomer combination used to prepare the acrylic polymer.

In certain embodiments, the acrylic polymer suitable for use in the present invention is the reaction product of one or more of the aforementioned silane-containing ethylenically unsaturated polymerizable materials and an ethylenically unsaturated polymerizable material that comprises carboxylic acid groups or an anhydride thereof to impart acid functionality to the acrylic polymer. Examples of suitable ethylenically unsaturated acids and/or anhydrides thereof include, without limitation, acrylic acid, vinyl phosphoric acid, methacrylic acid, itaconic acid, crotonic acid, maleic acid, maleic anhydride, citraconic anhydride, itaconic anhydride, ethylenically unsaturated sulfonic acids and/or anhydrides such as sulfoethyl methacrylate, and half esters of maleic and fumaric acids, such as butyl hydrogen maleate and ethyl hydrogen fumarate in which one carboxyl group is esterified with an alcohol. Ethylenically unsaturated carboxylic acids and/or anhydrides are used in certain embodiments. In certain embodiments, such acid and/or anhydride functional ethylenically unsaturated polymerizable materials are utilized in an amount sufficient to result in an acrylic polymer having acid value of up to 400, such as 20 to 80. For purposes of the present invention, the term "acid value" refers to the number of milligrams of KOH required to neutralize the acid in one gram of a test material and can be measured according to the method described in ASTM D1639. In certain embodiments, the amount of such acid and/or anhydride functional ethylenically unsaturated polymerizable materials ranges from up to 50 percent by weight, such as up to 10 percent by weight, based on the weight of the total monomer combination used to prepare the acrylic polymer.

In certain embodiments, the acrylic polymer suitable for use in the present invention is the reaction product of one or more of the aforementioned silane-containing ethylenically unsaturated polymerizable materials and an amino-functional ethylenically unsaturated polymerizable material to impart amine functionality to the acrylic polymer rather than acid functionality. Examples of suitable amino-functional ethylenically unsaturated polymerizable materials include, without limitation, p-dimethylaminomethyl styrene, t-butylaminoethylmethacrylate, p-dimethylaminoethyl styrene; dimethylaminomethyl acrylamide, dimethylaminopropyl acrylamide, dimethylaminopropyl methacrylamide, dimethylaminomethyl methacrylamide; dimethylaminoethyl (meth)acrylate, diethylaminoethyl (meth)acrylate, dimethylaminopropyl (meth)acrylate, and dimethylaminopropyl (meth)acrylamide. In certain embodiments, such amino-functional ethylenically unsaturated polymerizable materials are utilized in an amount sufficient to result in an acrylic polymer having amine value of up to 400, such as 10 to 80. In certain embodiments, the amount of such materials comprises up to 50 percent by weight, such as up to 10 percent by weight, based on the weight of the total monomer combination used to prepare the acrylic polymer. For purposes of the present invention, the term "amine value" refers to the number of milliequivalents of titratable amine in one gram of a test material multiplied by 56.1. See Siggia, Sidney "Quantitative Organic Analysis via Functional Groups", John Wiley & Sons, New York, N.Y. 1979.

In certain embodiments, in addition to or in lieu of the acid or amino-functional materials listed above, the acrylic polymer suitable for use in the present invention may be the reaction product of a non-ionic polymerizable material that is capable of rendering the resultant acrylic polymer water dispersible. Suitable materials for this purpose include, for example, (meth)acryloalkoxypolyalkylenes, such as, (meth) acryloalkoxyethylene glycols and/or ethers thereof, such as, for example, methoxypolyethylene glycol and/or butoxypolyethylene glycol. Such materials are commercially available and include, for example, MPEG 350 MA from Sartomer and the TONE™ series of materials from Dow Chemical. In certain embodiments, the amount of such materials comprises up to 50 percent by weight, such as up to 10 percent by weight, based on the weight of the total monomer combination used to prepare the acrylic polymer.

In certain embodiments, the acrylic polymer present in certain embodiments of the coating compositions of the present invention is also made from ethylenically unsaturated polymerizable material(s) substantially, or, in some cases, completely free of acid, amine, silane, and/or hydroxyl groups. Examples of such materials, which are suitable for use in preparing the acrylic polymer utilized in certain embodiments of the coating compositions of the present invention, are vinyl monomers, such as alkyl, cycloalkyl, or aryl acrylates and methacrylates having 1 to 6 carbon atoms in the esterifying group. Specific examples include methyl methacrylate and n-butyl methacrylate. Other suitable materials include lauryl methacrylate, 2-ethylhexyl methacrylate, isobornyl methacrylate, and cyclohexyl methacrylate. An aromatic vinyl monomer that is often included is styrene. Other materials that may be used are ethylenically unsaturated materials such as monoolefinic and diolefinic hydrocarbons, unsaturated esters of organic and inorganic acids, amides and esters of unsaturated acids, nitriles, and unsaturated acids. Examples of such monomers include, without limitation, 1,3-butadiene, acrylamide, acrylonitrile, alpha-methyl styrene, alpha-methyl chlorostyrene, vinyl butyrate, vinyl acetate, allyl chloride, divinyl benzene, diallyl itaconate, triallyl cyanurate, as well as mixtures thereof. In certain embodiments, the amount of ethylenically unsaturated polymerizable material(s) free of acid, amino, silane, and/or hydroxyl groups comprises up to 50 percent by weight, such as up to 30 percent by weight, based on the weight of the total monomer combination used to prepare the acrylic polymer.

In certain embodiments, the acrylic polymer utilized in certain embodiments of the coating compositions of the present invention is synthesized from a combination of unsaturated polymerizable materials comprising (a) 50 to 98 percent by weight, such as 70 to 90 percent by weight, of silane-containing ethylenically unsaturated polymerizable material(s); (b) 1 to 10 percent by weight, such as 3 to 6 percent by weight, of ethylenically unsaturated polymerizable materials that comprise carboxylic acid groups or an anhydride thereof; and (c) 1 to 49 percent by weight, such as 10 to 30 percent by weight, of ethylenically unsaturated polymerizable material(s) that are free of amine, acid, silane, and/or hydroxyl groups.

In certain embodiments, the acrylic polymer is formed by solution polymerization of the ethylenically unsaturated polymerizable material(s) in the presence of a polymerization initiator, such as azo compounds, such as alpha alpha'-azobis (isobutyronitrile), 2,2'-azobis (methylbutyronitrile) and 2,2'-azobis(2,4-dimethylvaleronitrile); peroxides, such as benzoyl peroxide, cumene hydroperoxide and t-amylperoxy-2-ethylhexanoate; tertiary butyl peracetate; tertiary butyl perbenzoate; isopropyl percarbonate; butyl isopropyl peroxy carbonate; and similar compounds. The quantity of initiator employed can be varied considerably; however, in most instances, it is desirable to utilize from 0.1 to 10 percent by weight of initiator based on the total weight of copolymerizable monomers employed. A chain modifying agent or chain transfer agent may be added to the polymerization mixture. The mercaptans, such as dodecyl mercaptan, tertiary dodecyl mercaptan, octyl mercaptan, hexyl mercaptan and the mercaptoalkyl trialkoxysilanes, such as 3-mercaptopropyl trimethoxysilane, may be used for this purpose as well as other chain transfer agents, such as cyclopentadiene, allyl acetate, allyl carbamate, and mercaptoethanol.

In certain embodiments, the polymerization reaction for the mixture of monomers to prepare the acrylic polymer is carried out in an organic solvent medium utilizing conventional solution polymerization procedures which are well known in the addition polymer art as illustrated with particularity in, for example, U.S. Pat. Nos. 2,978,437; 3,079,434 and 3,307,963, the relevant disclosures of which being incorporated by reference herein. Organic solvents which may be utilized in the polymerization of the monomers include virtually any of the organic solvents often employed in preparing acrylic or vinyl polymers such as, for example, alcohols, ketones, aromatic hydrocarbons or mixtures thereof. Illustrative of organic solvents of the above type which may be employed are alcohols such as lower alkanols containing 2 to 4 carbon atoms, including ethanol, propanol, isopropanol, and butanol; ether alcohols, such as ethylene glycol monoethyl ether, ethylene glycol monobutyl ether, propylene glycol monomethyl ether, and dipropylene glycol monoethyl ether; ketones, such as methyl ethyl ketone, methyl N-butyl ketone, and methyl isobutyl ketone; esters, such as butyl acetate; and aromatic hydrocarbons, such as xylene, toluene, and naphtha.

In certain embodiments, the polymerization of the ethylenically unsaturated components is conducted at from 0° C. to 150° C., such as from 50° C. to 150° C., or, in some cases, from 80° C. to 120° C.

Certain embodiments of the coating compositions of the present invention are made by forming an aqueous dispersion comprising the previously described acrylic polymer. Suitable, but non-limiting, methods for making such an aqueous dispersion are set forth in the Examples herein. In certain embodiments, the aqueous dispersion comprising the acrylic polymer is prepared by first preparing an acid-functional acrylic polymer in an organic solvent (as described above) and then neutralizing acid groups on the acrylic polymer with an alkaline material, such as an amine, during or prior to contacting the polymer with water. Suitable amines that may be used for this purpose include, but are not limited to, dialkanolamines, trialkanolamines, alkylalkanolamines, and arylalkanolamines containing from 2 to 18 carbon atoms in the alkanol, alkyl, and aryl chains. Specific examples include N-ethylethanolamine, N-methylethanolamine, dimethylethanolamine, diethanolamine, triethanolamine, N-phenylethanolamine and diisopropanolamine. Also suitable are amines which do not contain hydroxyl groups, such as trialkylamines, diamines and mixed alkyl-aryl amines and substituted amines in which the substituents are other than hydroxyl can also be used. Specific examples of these amines are triethylamine, methylethylamine, 2-methylpropylamine, diethylamine, dipropylamine, dibutylamine, dicocoamine, diphenylamine, N-methylaniline, diisopropylamine, methylphenylamine and dicyclohexylamine. Also, amines with ring structures such as morpholine, piperidine, N-methylpiperazine and N-hydroxyethylpiperazine can be used. Ammonia can also be used and is considered for the purposes of this application to be an amine.

As will be appreciated, in the case where the polymer is cationic, i.e., it contains amino-functionality, as described above, embodiments of the coating compositions of the present invention can be made by forming an aqueous dispersion comprising such a polymer according to the method described in the Examples herein. In certain embodiments, such an aqueous dispersion is prepared by first preparing an amino-functional polymer in an organic solvent and then neutralizing the amino groups with an acidic material, during or prior to contacting the polymer with water.

In certain embodiments, the continuous phase of the aqueous dispersion comprises exclusively water. In some embodiments, however, organic solvent may be present in the aqueous dispersion as well (as part of the dispersed phase) to, for example, assist in lowering the viscosity of the polymer(s) to be dispersed. For example, in certain embodiments, the aqueous dispersion comprises up to 50 weight percent, such as up to 25 weight percent, or, in some cases, up to 15 weight percent organic solvent, with weight percent being based on the total weight of the aqueous dispersion. Examples of suitable solvents which can be incorporated in the organic component of the aqueous dispersion are alcohols, such as ethanol and/or isopropanol, xylene, ketones, such as methyl amyl ketone, methyl isoamyl ketone, and/or methyl isobutyl ketone, and/or an acetate, such as n-butyl acetate, t-butyl acetate, and/or butyl carbitol acetate. In certain embodiments, the continuous phase is present in an amount sufficient to result in a low-solids coating composition.

In some cases, the polymer comprising silanol functional groups described above may be the only polymeric material present in the composition, however, in other cases, such a polymer may be present in the composition in combination with other polymeric materials. In certain embodiments of the present invention, therefore, the polymer comprising silanol functional groups is present in an amount of at least 25 percent by weight, such as at least 50 percent by weight, with the weight percents being based on the total weight of organic resin solids in the composition.

In certain embodiments, the coating compositions of the present invention also comprise a photocatalytic material. As used herein, the term "photocatalytic material" refers to a material that is photoexcitable upon exposure to, and absorption of, radiation, such as ultraviolet or visible radiation. In certain embodiments of the present invention, the photocatalytic material comprises a metal oxide, such as zinc oxide, tin oxide, ferric oxide, dibismouth trioxide, tungsten trioxide, strontium titanate, titanium dioxide (anatase, brookite, and/or rutile forms), or mixtures thereof. In certain embodiments of the present invention, at least a portion of the photocatalytic material is present in the composition in the form of particles having an average crystalline diameter of 1 to 100 nanometers, such as 3 to 35 nanometers, or, in yet other embodiments, 7 to 20 nanometers.

In certain embodiments of the present invention, the photocatalytic material is provided in the form of a sol comprising particles of photocatalytic material dispersed in water, such as a titania sol. Such sols are readily available in the marketplace. Examples of such materials, which are suitable for use in the present invention, include, without limitation, S5-300A and S5-33B available from Millennium Chemicals, STS-01, STS-02, and STS-21 available from Ishihara Sangyo Corporation, and NTB-1, NTB-13 and NTB-200 available from Showa Denko Corporation.

In certain embodiments of the present invention, the amount of the photocatalytic material that is present in the composition ranges from 0.05 to 5 percent by weight, such as 0.1 to 0.75 percent by weight, with weight percents being based on the total weight of the composition.

In certain embodiments of the present invention, however, the coating composition is substantially free or, in some cases, completely free, of a photocatalytic material. As used herein, the term "substantially free" means that the material being discussed is present, if at all, as an incidental impurity. In other words, the material does not affect the properties of the composition. As used herein, the term "completely free" means that the material is not present at all.

In certain embodiments, the coating compositions of the present invention also comprise a non-polymeric silanol containing material. As used herein, the term "non-polymeric silanol containing material" refers to materials that include silanol functional groups, but which lack an organic polymeric backbone. In certain embodiments, for example, such a non-polymeric silanol containing material comprises an essentially completely hydrolyzed organosilicate. As used herein, the term "organosilicate" refers to a compound containing organic groups bonded to a silicon atom through an oxygen atom. Suitable organosilicates include, without limitation, organoxysilanes containing four organic groups bonded to a silicon atom through an oxygen atom and organoxysiloxanes having a siloxane main chain $((Si—O)_n)$ constituted by silicon atoms. Such materials, as well as methods for their manufacture, are described in U.S. Pat. No. 6,599,976 at col. 3, line 57 to col. 10, line 58, the cited portion of which being incorporated herein by reference. Non-limiting examples of commercially available materials that are essentially completely hydrolyzed organosilicates, and which are suitable for use in the compositions of the present invention, are MSH-200, MSH-400, and MSH-500, silicates available from Mitsubishi Chemical Corporation, Tokyo, Japan and Shinsui Flow MS-1200, available from Dainippon Shikizai, Tokyo, Japan. In certain embodiments of the present invention, the composition comprises up to 80 percent by weight of the essentially completely hydrolyzed organosilicate, such as 20 to 80 percent by weight, with the weight percents being based on the total solids weight of the composition.

In certain embodiments, the non-polymeric silanol containing material comprises silica particles comprising silanol surface active groups. Examples of such materials include calcium ion-exchanged silica, colloidal silica, synthetic amorphous silica, and mixtures thereof. Suitable calcium ion-exchanged silica is commercially available from W. R. Grace & Co. as SHIELDEX® AC3. Suitable colloidal silica is available from Nissan Chemical Industries, Ltd. under the tradename SNOWTEX® and from Nayacol Nano Technologies Inc. under the tradename NexSil™. Suitable amorphous silica is available from W. R. Grace & Co. under the tradename SYLOID®). When used, such particles are often included in the compositions of the present invention in an amount of up to 80 percent by weight, such as 20 to 80 percent by weight, with the weight percents being based on the total solids weight of the composition.

In certain embodiments, the non-polymeric silanol containing material comprises a silicic acid, such as orthosilicic acid ($H_4SiO_4$), metasilicic acid ($H_2SiO_3$) and/or a condensation product thereof, such as, but not limited to, disilicic acid ($H_2Si_2O_5$) and/or pyrosilicic acid ($H_6Si_2O_7$). When used, the silicic acid is often included in the compositions of the present invention in an amount of up to 80 percent by weight, such as 20 to 80 percent by weight, with the weight percents being based on the total solids weight of the composition.

In certain embodiments, particularly when the composition is desired to be applied over a coated substrate, such as a substrate coated with an organic coating, the coating compositions of the present invention comprise a surfactant. Examples of surface active agents suitable for use in the present invention include, without limitation, the materials identified in U.S. Pat. No. 6,610,777 at col. 37, line 22 to col. 38, line 60 and U.S. Pat. No. 6,657,001 at col. 38, line 46 to col. 40, line 39, the cited portions of both of which being incorporated herein by reference.

In certain embodiments of the present invention, the amount of surfactant that is present in the composition ranges from 0.01 to 10 percent by weight, such as 0.01 to 5 percent by weight, or, in other embodiments, 0.1 to 3 percent by weight based on the total weight of the composition.

The coating compositions of the present invention may contain other components. Examples of such other components include various fillers, plasticizers, pigments, dyes, odorants, bittering agents, antioxidants, mildewcides, fungicides, flow control agents, such as thixotropes, and the like.

In certain embodiments, the compositions of the present invention may also include a crosslinking agent that comprises a material having functional groups, other than silanol groups, which are reactive with the silanol groups on the polymer. Suitable materials may include, for example, titanates, metal salts, certain organic alcohols, such as propylene glycol, ethylene glycol, trimethylolpropane, and pentaerythritol, and/or hydroxyl-functional polymers. Catalysts may also be included in the present compositions to, for example, accelerate the self-condensation of silanol groups with each other and/or reaction of the silanol groups with the aforementioned crosslinking agent. Suitable materials for this purpose include, without limitation, acids, bases, and tin complexes.

In certain embodiments, the coating compositions of the present invention are applied to at least a portion of a substrate and permitted to dry and/or cure. Suitable substrates that may be coated include any substrate as would be apparent to one skilled in the art in view of this disclosure, including various metals, plastics, previously coated substrates, wood, glass, and the like. Application of the coating composition to the substrate can be accomplished by any suitable means, such as wiping, dipping, spraying, rolling, brushing, etc.

After application to the substrate, the composition is dried and/or cured. As used herein, the term "cure" means that at least some crosslinkable components in the composition are at least partially crosslinked. In certain embodiments, the coating compositions of the present invention, upon application to a substrate, are cured at ambient conditions. As used herein, the term "ambient conditions" refers to the conditions of the surrounding environment (e.g., the temperature, humidity, and pressure of the room or outdoor environment in which the substrate is located). During the curing process, it is believed by the inventors, although not being bound to any one theory, that a portion of the silanol groups self condense (i.e., cross-link with each other) to cure the film on a substrate while other silanol groups do not self condense and are exposed at the surface of the cured film.

As previously indicated, certain embodiments of the coating compositions of the present invention can have a very low solids content, as low as 1 percent by weight, based on the total weight of the composition. Consequently, it has been found that certain embodiments of the coating compositions of the present invention can be applied to a substrate in the form of an extremely thin film. In particular, according to certain embodiments of the present invention, the composition is applied to a substrate in the form of a thin film that has a dry film thickness of no more than 0.5 mils (12.7 micrometers), such as no more than 0.05 mils (1.3 micrometers).

It has been found by the inventors that some embodiments of the coating compositions of the present invention produce a coating film having favorable application and appearance properties. As used herein, the term "coating film" refers to a dried and/or cured coating that is deposited upon a substrate, such films often are, but need not necessarily be, a continuous film. Such coatings also often exhibit hydrophilic properties at the surface thereof. One way to assess the hydrophilicity of a material is to measure the contact angle of water with the coating. Such a contact angle can be measured by the method described in the Examples herein. In certain embodiments, the coating compositions of the present invention produce a dry film on a substrate that exhibits a contact angle with water, when measured up to 24 hours after formation of the film, that is less than the contact angle that the substrate surface exhibits in the absence of such a coating. In certain embodiments, such a contact angle is at least 30% or, in some cases, at least 50%, or, in yet other cases, at least 75% less than the contact angle that the substrate surface exhibits in the absence of the coating.

As should be apparent, therefore, the present invention is also directed to coating films comprising a polymer comprising silanol groups that are present in an amount sufficient to render the coating film hydrophilic. As used herein, the term "hydrophilic" means that the coating film exhibits a contact angle with water, when measured up to 24 hours after formation of the film, that is less than the contact angle that the substrate surface would exhibit in the absence of such a coating film, such reductions can be at least 30% or, in some cases, at least 50%, or, in yet other cases, at least 75%.

As should also be apparent, the present invention is also directed to methods for imparting self cleaning properties to at least a portion of a substrate. The methods comprise (i) applying to the substrate a low-solids, aqueous coating composition comprising a polymer comprising silanol groups, and (ii) allowing the composition to cure such that the resulting coating film is hydrophilic.

In certain embodiments, such methods also comprise cleaning the substrate with an alkaline cleaner prior to application of a low-solids, aqueous coating composition of the present invention. The pH of such cleaners is often above 10.

In certain embodiments, after any cleaning and prior to application of a coating composition of the present invention, a pretreatment or "size coat" may be applied to the substrate. Such materials may comprise an organic solvent wipe of the substrate, for example, isopropanol or a mixture of two or more different alcohols. In some cases, the pretreatment may comprise application of a thin film of an adhesion promoting polymer solution and/or a "tie-coat." In yet other cases, the pretreatment may comprise a polymeric solution which may improve the final appearance of the coated substrate.

Certain embodiments of the coating compositions of the present invention have shown to be particularly valuable for use in coating substrates that are continuously exposed to dust or dirt. It has been found that, in at least some cases, substrates at least partially coated with a composition of the present invention exhibit reduced sticking or caking of dust and/or dirt thereto. One exemplary application involves the use of the composition to coat automobile wheel rims. Once the wheels become dirty from operation, specifically from brake dust, it has been found that, in many cases, the dust can be substantially removed by rinsing the wheel with water without the need for scrubbing, wiping, or applying harsh cleaners. As such, by coating a substrate with a composition of the present invention, cleaning times can, in many cases, be reduced.

Illustrating the invention are the following examples, which, however, are not to be considered as limiting the invention to their details. Unless otherwise indicated, all parts and percentages in the following examples, as well as throughout the specification, are by weight.

EXAMPLES

Examples 1-7

Preparation of Acrylic Polymer

For each of Examples 1 to 7, see Table 1, a reaction flask was equipped with a stirrer, thermocouple, nitrogen inlet and a condenser. Charge A was then added and stirred with heat to reflux temperature (75° C.-80° C.) under nitrogen atmosphere. To the refluxing ethanol, charge B and charge C were simultaneously added over three hours. The reaction mixture was held at reflux condition for two hours. Charge D was then added over a period of 30 minutes. The reaction mixture was held at reflux condition for two hours and subsequently cooled to 30° C.

TABLE 1

|  | 1 | 2 | 3 | 4 | 5 | 6 | 7 |
|---|---|---|---|---|---|---|---|
| Charge A (weight in grams) | | | | | | | |
| Ethanol SDA 40B[1] | 180.2 | 181 | 156.6 | 180.3 | 232.2 | 232.6 | 1145.0 |
| Charge B (weight in grams) | | | | | | | |
| Methyl Methacrylate | 15.2 | 30.0 | — | 15.1 | 13.4 | 32.8 | 109.7 |
| Methacrylic acid | 4.5 | 4.7 | 4.0 | — | — | — | — |
| Silquest A-174[2] | 52.9 | 38.2 | 59.1 | 52.8 | 77.7 | 60.0 | 322.9 |
| t-Butylaminoethyl methacrylate | — | — | — | 4.6 | — | — | — |
| Acrylic acid | — | — | — | — | 5.9 | 5.9 | 27.4 |
| 2-hydroxylethylmethacrylate | — | — | — | — | 0.1 | 0.1 | 0.6 |
| n-Butyl acrylate | — | — | — | — | 0.1 | 0.1 | 0.6 |
| Ethanol SDA 40B | — | — | — | — | — | — | 495.6 |
| Charge C (weight in grams) | | | | | | | |
| Vazo 67[3] | 3.0 | 3.0 | 3.0 | 3.2 | 6.3 | 6.3 | 19.6 |
| Ethanol SDA 40B | 99.3 | 99.1 | 99.4 | 99.1 | 133.8 | 133.8 | 244 |
| Charge D (weight in grams) | | | | | | | |
| Vazo 67 | 0.8 | 0.8 | 0.8 | 0.9 | 1.0 | 1.1 | 5.0 |
| Ethanol SDA 40B | 25.2 | 25.0 | 25.2 | 25.1 | 33.8 | 33.8 | 28.9 |
| % Solids | 20.3 | 19.35 | 19.3 | 20.4 | 19.04 | 19.4 | 19.55 |
| Acid value (100% solids basis) | 38.4 | 40.0 | 39.0 | — | 42.7 | 42 | 43 |
| Amine value (100% solids basis) | — | — | — | 18.1 | — | — | — |

[1]Denatured ethyl alcohol, 200 proof, available from Archer Daniel Midland Co.
[2]gamma-methacryloxypropyltrimethoxysilane, available from OSi Specialties Inc.
[3]2,2'-azo bis(2-methyl butyronitrile), available from E. I. duPont de Nemours & Co., Inc.

Examples 8-14

Preparation of Coating Compositions

Example 8

To 30.0 grams of the composition of Example 1, a mixture of 1.0 gram dimethylethanolamine and 120 grams of deionized water was added over 10 minutes under agitation. Then, the mixture was stirred for 30 minutes. The resulting mixture had a solids content of 4.5 percent by weight, and a pH of 9.13. The hydrolyzed polymer had a calculated silanol value (100% solids basis) of 531.3.

For purposes of the present invention, the silanol value for a polymer (100% solids basis) is calculated as follows: The total weight of monomers plus initiator in the composition is determined. For Example 1 this weight was 76.4 grams. The number of moles of silane-containing materials used is determined. For Example 1, 0.213 moles of Silquest A-174 was used, which was calculated by dividing 52.9 grams Silquest A-174 by 248 (the molecular weight of Silquest A-174). The number of equivalents of hydrolyzable ester groups in the polymer is then determined. For Example 1, this value was determined to be 0.639, which was calculated by multiplying the number of moles of Silquest A-174 by 3 (there are 3 ester groups on each Silquest A-174 molecule). The silanol ester equivalent weight for the polymer is then determined. For Example 1, this value was 119.6, which was calculated by dividing 76.4 by 0.639. It is to be assumed for purposes of calculating silanol value that each hydrolyzable ester group will release one methanol molecule and the weight loss for each methanol molecule released is 14 grams per mole. The silanol equivalent weight is then determined by subtracting 14 from the silanol ester equivalent weight. For Example 1, this was 105.6, which was calculated by subtracting 14 from 119.6. Silanol value is then determined by dividing 56,100, which is the molecular weight of KOH in milligrams, by the silanol equivalent weight. For Example 1 this was determined to be 531.3, which was calculated by dividing 56,100 by 105.6.

Example 9

To 30 grams of the composition of Example 2, a mixture of 0.6 grams dimethylethanolamine and 10.0 grams of deionized water was added over a minute under agitation. The mixture was stirred for 4 minutes and 110 grams of water was added over 5 minutes. Then, the mixture was stirred for 30 minutes. The resulting mixture had a solids content of 3.9 percent by weight and a pH of 8.6. The hydrolyzed polymer had a calculated silanol value (100% solids basis) of 369.1. Silanol value was calculated using the procedure described in Example 8.

Example 10

To 30.9 grams of the composition of Example 3, a mixture of 1.0 gram dimethylethanolamine and 120 grams of deionized water was added over 10 minutes under agitation. Then, the mixture was stirred for 30 minutes. The resulting mixture had a solids content of 4.0 percent by weight and a pH of 9.2. The hydrolyzed polymer had a calculated silanol value (100% solids basis) of 705.0. Silanol value was calculated using the procedure described in Example 8.

Example 11

To 15 grams of the composition of Example 4, a mixture of 0.4 grams acetic acid and 10.0 grams of deionized water was added over a minute under agitation. The mixture was stirred for 2 minutes and 50 grams of water was added over 5 minutes. Then, the mixture was stirred for 30 minutes. The resulting mixture had a solids content of 4.1 percent by weight and a pH of 4.6. The hydrolyzed polymer had a calculated silanol value (100% solids basis) of 529.6. Silanol value was calculated using the procedure described in Example 8.

Example 12

To 100 grams of the composition of Example 5, a mixture of 14.43 grams of 10% dimethylethanolamine solution and 15.58 grams deionized water was added over 2 minutes with stirring. Then, over the course of 5 minutes, 270.01 grams of deionized water was added with stirring. The mixture was then stirred for an additional 23 minutes. The resulting mixture had a solids content of 5.0 percent by weight and a pH of 7.9. The hydrolyzed polymer had a calculated silanol value (100% solids basis) of 577.3. Silanol value was calculated using the procedure described in Example 8.

Example 13

To 20 grams of the composition of Example 6, a mixture of 2.89 grams of 10% dimethylethanolamine solution and 27.09 grams deionized water was added with stirring over 2 minutes. Then, over the course of 5 minutes, 350.02 grams of deionized water was added with stirring. The mixture was then stirred for an additional 23 minutes. The resulting mixture had a solids content of 1 percent by weight and a pH of 7.7. The hydrolyzed polymer had a calculated silanol value (100% solids basis) of 423.5. Silanol value was calculated using the procedure described in Example 8.

Example 14

To a stirred mixture of 995.8 grams water, 89.9 grams ethanol, 3.0 grams AEROSOL OT -75 (Sodium dioctyl sulphosuccinate available from Cytec Industries Inc., Kalamazoo, Mich.), 15.4 grams BYK-348 (Polyether modified dimethyl polysiloxane available from Byk-Chemie, Wesel Germany), 23.1 grams BYK 020 (Modified polysiloxane copolymer available from Byk-Chemie, Wesel Germany), 15.4 grams SURFYNOL 465 (Non-ionic surfactant available from Air Products and Chemicals Inc. Allentown, Pa.), and 10.7 grams dimethylethanolamine, 375.8 grams of the composition of Example 7 was added over 15 minutes. Then, the mixture was stirred for 30 minutes. The resulting mixture had a solids content of 6.5 percent by weight and a pH of 9.1. The hydrolyzed polymer had a calculated silanol value (100% solids basis) of 508.3 (calculated using the procedure described in Example 8). The mixture was diluted with an equal amount of water to spray as described in Example 20.

Examples 15-18

Test Substrates

The compositions of Examples 8 through 11 were each applied to clearcoated aluminum test panels, (epoxy-acid powder clearcoat supplied by PPG Industries Inc.), via applying approximately 2 milliliters of the composition to a paper towel and wiping the solution over the clearcoat surface. A film of the material was deposited on the panel. The material was allowed to dry in place at ambient conditions for four hours before testing for hydrophilicity. To determine hydrophilicity, the treated panel was immersed in a stream of running water for 5 seconds at an angle of 45 degrees and removed. The test panel was then set at a 90 degree angle where the water continued to wet the substrate in the form of a continuous sheet. The test was repeated on a similar panel without any surface treatment. In this case, water was observed to form beads which quickly rolled off of the panel.

Example 19

Surface Treatment Contact Angle Experiments

The compositions of Examples 8, 12 and 13 were applied to clearcoated aluminum test panels and allowed to dry in place at ambient conditions overnight. The panels were then examined for contact angle with water using a VCA 2500 XE Video Contact Angle System. Test specimens were also prepared for brake dust resistance testing as per the following procedure: A machine lathe was customized to hold a standard car rotor. Test panels were mounted perpendicularly on an aluminum block collar 1 inch from the rotor. A standard brake pad cut in half to reduce heat generation was applied to the spinning rotor (654 rpm) using a spring rated at 943 lb/inch (compressed 220 thousands of an inch) for three 10 minute sessions. After each 10 minute interval, the pad and rotor were disengaged for 3 minutes for cooling and to prevent pad glazing. The final result provided a blackened test panel with approximately 0.0150 g of brake dust accumulation. These panels were then rinsed with standard garden hose water pressure. The following table illustrates the results.

| Treatment Example | Contact Angle | Application | Brake Dust Resistance |
| --- | --- | --- | --- |
| 8 | 54° | Good uniform film | Excellent, no dust film, streaks or dirt marks |
| 12 | 57.3° | Good uniform film | Excellent, no dust film, streaks or dirt marks |
| 13 | 73.4° | Poor, dewetting of treatment to surface | Nearly as much dust as the control. Dirty spots from dewetting on some areas |
| Control - no treatment | 82° | NA | Poor, dusty film and regions of streaks and/or dirt marks |

Example 20

Surface Treatment Automotive Wheel

The composition of Example 14 was spray applied to powder clearcoated aluminum test panels using a pump aerosol applicator and allowed to dry in place at ambient conditions overnight before testing. Contact angle with water was measured to be 5.8° and simulated brake dust resistance testing produced excellent results with no brake dust film being retained after rinsing with water. A similar test panel without surface treatment was found to have a contact angle with water of 85°. The material was also spray applied to ½ of the right front wheel of a 2001 OLDSMOBILE ALERO and allowed to dry in place before returning the vehicle to service. After 600 miles of service the wheel was rinsed with a vigorous spray from a garden hose and the treated and untreated portions of the wheel were observed for differences. The untreated portion of the wheel was observed to already be collecting brake dust residue which could not be removed without mechanical agitation. The treated portion of the wheel was observed to have significantly less brake dust residue after rinsing with the same garden hose.

The invention claimed is:

1. A low-solids, aqueous coating composition comprising a polymer comprising silanol functional groups that are present on the polymer in an amount sufficient to give the polymer a silanol value of at least 300, wherein the composition has a resin solids content of no more than 15 percent by weight, based on the total weight of the composition.

2. The composition of claim 1, wherein the composition has a resin solids content of 1 to 10 percent by weight, based on the total weight of the composition.

3. The composition of claim 1, wherein the silanol functional groups are present on the polymer in an amount sufficient to give the polymer a silanol value of 400 to 800.

4. The coating composition of claim 1, wherein the composition is in the form of an aqueous dispersion comprising the polymer comprising silanol functional groups.

5. The composition of claim 1, wherein the polymer comprising silanol functional groups comprises an acrylic polymer.

6. The composition of claim 5 wherein the acrylic polymer is synthesized from a combination of unsaturated polymerizable materials comprising: (i) a silane-containing ethylenically unsaturated polymerizable material, (ii) an ethylenically unsaturated polymerizable material comprising acid and/or anhydride groups, and (iii) an ethylenically unsaturated polymerizable material substantially free of acid, amine, silane, and/or hydroxyl groups.

7. The composition of claim 6 wherein the acrylic polymer is synthesized from a combination of unsaturated polymerizable materials comprising: (i) 50 to 98 percent by weight of a silane-containing ethylenically unsaturated polymerizable material, (ii) 1 to 10 percent by weight of an ethylenically unsaturated polymerizable material comprising acid and/or anhydride groups, and (iii) 1 to 49 percent by weight of an ethylenically unsaturated polymerizable material substantially free of acid, amine, silane, and/or hydroxyl groups, wherein the percents by weight are based on the weight of the total monomer combination used to prepare the acrylic polymer.

8. The composition of claim 1, wherein the polymer comprising silanol functional groups is present in an amount of at least 25 percent by weight based on the total weight of organic resin solids in the composition.

9. The composition of claim 1, further comprising a non-polymeric silanol containing material.

10. The composition of claim 9, wherein the non-polymeric silanol containing material comprises an essentially completely hydrolyzed organosilicate, silicic acid, and/or silica particles.

11. The composition of claim 1 further comprising a surfactant.

12. The composition of claim 11 wherein the surfactant is present in an amount ranging from 0.01 to 10 percent by weight based on the total weight of the composition.

13. A substrate at least partially coated with the composition of claim 1.

14. The substrate of claim 13 wherein the substrate is a wheel rim of a motor vehicle.

15. A method of coating at least a portion of a substrate comprising:
applying the composition of claim 1 to the substrate, and allowing the composition to cure.

16. The method of claim 15, wherein the cure takes place at ambient conditions.

17. A coating film deposited from the coating composition of claim 1, wherein the coating film exhibits a contact angle with water that is at least 30% less than the contact angle that the substrate would exhibit in the absence of the coating film.

18. The coating film of claim 17, wherein the coating film exhibits a contact angle with water that is at least 50% less than the contact angle that the substrate would exhibit in the absence of the coating film.

19. A method for imparting self cleaning properties to at least a portion of a substrate comprising:
(a) applying to the substrate the composition according to claim 1, and
(b) allowing the composition to cure such that the resulting coating film is hydrophilic.

20. The method of claim 19 further comprising applying a pretreatment to the substrate prior to application of the low-solids, aqueous coating composition.

* * * * *